July 13, 1954     T. E. M. CARVILLE ET AL     2,683,824
CAPACITOR MOUNTING BRACKET FOR ELECTRIC MOTORS
Filed Sept. 19, 1950
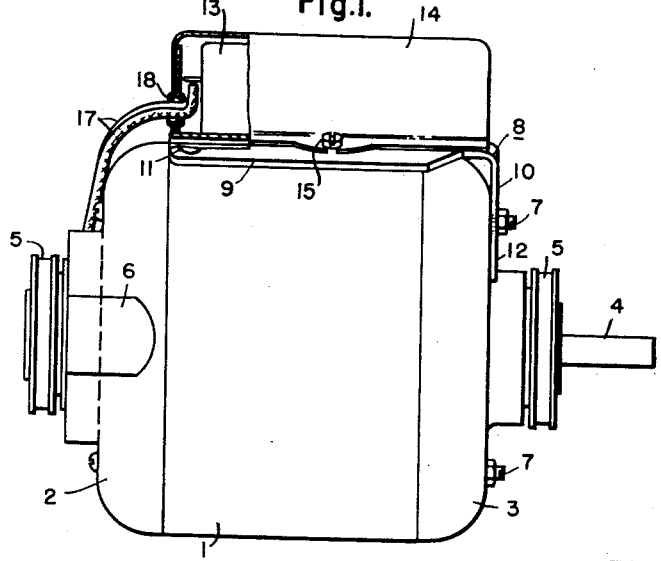
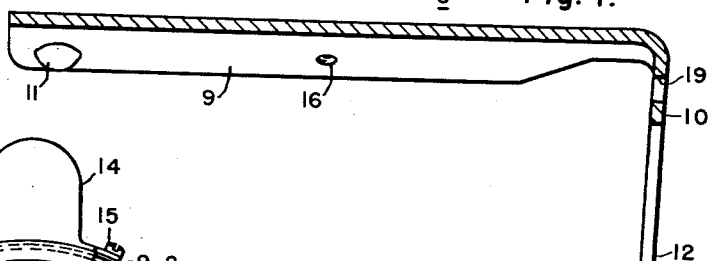
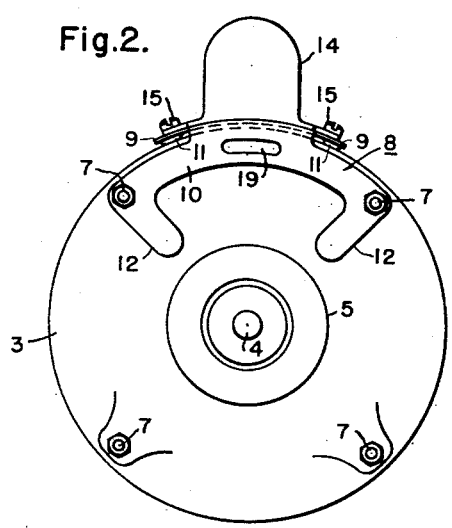
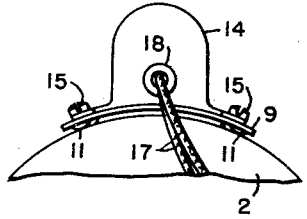
WITNESSES:
INVENTORS
Theodore E. M. Carville
and Raymond W. Esarey.
BY
ATTORNEY Patented July 13, 1954

2,683,824

UNITED STATES PATENT OFFICE 2,683,824

CAPACITOR MOUNTING BRACKET FOR ELECTRIC MOTORS

Theodore E. M. Carville and Raymond W. Esarey, Lima, Ohio, assignors to Westinghouse Electric Corporation, East Pittsburgh, Pa., a corporation of Pennsylvania Application September 19, 1950, Serial No. 185,592

7 Claims. (Cl. 310—72)

The present invention relates to single-phase electric motors of the capacitor type, and more particularly to bracket means for mounting a capacitor on such motors.

The bracket to which the invention is especially directed is intended primarily for mounting a capacitor on a standard split-phase motor to enable the conversion of the motor to a capacitor type of motor, although it will be apparent that the usefulness of the invention is not limited to this particular application. Single-phase induction motors of the split-phase type have a main, or running, primary winding and an auxiliary, or starting, primary winding, which are physically displaced from each other on the stator of the motor. The auxiliary winding is designed with relatively high resistance and low reactance, as compared to the main winding, so that the currents in the two windings differ in phase, when the windings are connected in parallel to a single-phase line, and a starting torque is developed, the auxiliary winding being disconnected after the motor has come up to speed. Motors of this type have relatively low starting torque, however, and the starting torque can be increased by connecting a capacitor in series with the auxiliary winding, to increase the phase difference between the currents in the two windings, thus, in effect, converting the motor to a capacitor-start type of motor. Since split-phase motors are substantially cheaper in price than standard capacitor-start motors, increased starting torque can be obtained in this way at relatively low cost, and there is considerable demand for split-phase motors provided with starting capacitors.

Standard split-phase motors are built in large quantities by mass production methods, and any change or modification in the construction of these motors, even a minor change such as the provision of holes for mounting a capacitor bracket, involves considerable difficulty and increased cost, when the modification is applied only to a part of the total number of motors produced. For this reason, the addition of a capacitor to standard split-phase motors has been a troublesome problem because of the necessity of providing mounting holes, or other means, for mounting a capacitor on the motor.

The principal object of the present invention is to provide a capacitor-type motor in which the capacitor is mounted on the motor by means of a bracket which requires no extra mounting holes, or other special provision for mounting the bracket, so that the capacitor can be mounted on a standard motor of any type without any modification whatever in the motor itself.

Another object of the invention is to provide a capacitor mounting bracket which can be mounted on a motor by means of the usual through bolts which secure the end brackets of the motor in place, without requiring any modification of the motor itself.

Other objects and advantages of the invention will be apparent from the following detailed description, taken in connection with the accompanying drawing, in which:

Figure 1 is a side elevation of an electric motor with a capacitor mounted thereon;

Fig. 2 is an end view of the motor, as viewed from the right-hand end of Fig. 1;

Fig. 3 is a fragmentary end view of the opposite end of the motor, and

Fig. 4 is a longitudinal sectional view of the mounting bracket.

The invention is shown in the drawing applied to a split-phase motor, of standard construction, having a cylindrical frame 1 closed at the ends by end brackets 2 and 3. It will be understood that the usual stator core and primary windings are supported in the frame 1, and a rotor member of usual type is mounted on the shaft 4, which is supported in suitable bearings in the end brackets 2 and 3. Rubber mounting rings 5 may be applied to the end brackets for resiliently mounting the motor, and a terminal box 6 is formed integrally with the end bracket 2. The end brackets 2 and 3 are secured to the frame 1 by through bolts 7 extending longitudinally through the motor adjacent its periphery. The particular details of the motor construction are not a part of the invention, and the motor shown is to be regarded as illustrative of any split-phase motor, or other type of motor, of standard construction.

As previously indicated, it is often desired to connect a capacitor in series with the auxiliary or starting winding of a split-phase motor, in order to increase the starting torque. Since these motors are built in large quantities by the use of special tools and fixtures which are designed and arranged for high production at minimum cost, any modification, such as the provision of mounting holes for mounting a capacitor, which is to be applied to only a part of the total production, presents a troublesome problem and involves considerable difficulty and expense.

The present invention provides a mounting bracket which makes it possible to mount a capacitor on a standard split-phase motor without requiring any modification of any kind in the motor itself. As shown in the drawing, the mounting bracket 8 is preferably made of a single piece of sheet metal, and includes a body portion 9, which extends longitudinally of the motor, and a mounting portion 10, which is adapted to be secured on an end surface of the motor. As clearly shown in Fig. 4, the body portion 9 and the mounting portion 10 of the bracket join each other at an angle which is less than 90°. The body portion 9 is transversely curved to conform to the surface of the motor frame 1 and is provided with inwardly extending projections or pressure pads 11 near the end opposite the mounting portion. The projections 11 may be embossed in the bracket, or may be formed in any other desired manner.

The mounting portion 10 of the bracket 8, as best seen in Fig. 2, is generally arcuate and extends circumferentially of the motor, the angular extent of the arcuate mounting portion being slightly more than the distance between adjacent through bolts 7 of the motor, and the mounting portion is provided with holes near its ends in position to engage the through bolts 7. The mounting portion 10 also has two arms 12 which extend radially inward from the ends of the mounting portion to engage the surface of the motor end bracket.

The bracket 8 is mounted on the motor by removing the nuts from two of the through bolts 7, placing the bracket in position with the through bolts extending through the holes in the mounting portion of the bracket, and replacing and tightening the nuts. It will be seen that this secures the mounting portion 10 tightly against the end bracket 3 of the motor, with the body portion 9 of the bracket extending longitudinally over the motor frame and with the pressure pads or projections 11 engaging the opposite end of the frame. Since the angle between the mounting portion 10 and body portion 9 is less than 90°, the pressure pads 11 are forced tightly against the frame of the motor and the bracket is firmly and solidly held in position.

A capacitor 13 is mounted on the body portion 9 of the bracket and is preferably enclosed in a housing 14, which may be made of sheet metal, or other suitable material, and which is secured in position by mounting screws 15 engaging in threaded holes 16 in the body portion 9 of the bracket. The capacitor leads 17 may be brought out through an insulating bushing 18 in the end of the housing 14 and carried into the terminal box 6 for connection in the motor circuit.

It will be apparent that with the construction described, the bracket can easily be mounted on a standard motor by utilizing the conventional through bolts, so that no modification or change of any kind is required in the motor itself to permit mounting the capacitor. It will also be seen that the bracket can be mounted in any one of four positions around the circumference of the motor. In order to increase the number of possible mounting positions, the mounting portion 10 of the bracket may be provided with an additional mounting hole or opening 19 halfway between its extremities. The opening 19 may be a round hole similar to the other mounting holes, or preferably it may be an elongated slot as shown in Fig. 2. The mounting hole 19 may be utilized alone for receiving one of the through bolts 7 to mount the bracket in any angular position between the four positions possible when mounted on two through bolts. When thus mounted on a single through bolt, the radial arms 12 of the bracket 8, which engage the surface of the end bracket 3, function as pressure pads so that the bracket is supported in place by engagement of the nut on a single through bolt 7, and by the four pressure pads 11 and 12 which firmly engage the motor so that the bracket is solidly held in position.

It will be seen that the bracket 8 can be mounted in any desired angular position about the periphery of the motor, so that the requirements of different users of motors can be met by the use of the same bracket without requiring any changes or modifications in the motor itself, or in the bracket. The new bracket makes it possible to meet the demand for standard split-phase motors with capacitors mounted on them easily and inexpensively. It has not previously been possible to provide such motors except by making modifications in standard motors for mounting the capacitor, and these modifications differed in accordance with differing positions of the capacitor as required by different users. The present invention eliminates the necessity for such modifications, and makes it possible to use a simple, inexpensive mounting bracket to mount a capacitor in any desired position on a standard motor without requiring any modifications whatever in the motor itself.

A specific embodiment of the invention has been shown and described for the purpose of illustration, but it will be obvious that the invention is applicable to capacitor motors of any type, and that various other embodiments and modifications are possible within the scope of the invention. It is to be understood, therefore, that the invention is not limited to the specific detailed construction shown and described, but in its broadest aspects, it includes all equivalent embodiments and modifications which come within the scope of the appended claims.

We claim as our invention:

1. In combination, an electric motor, said motor having bolts extending longitudinally therethrough adjacent its periphery, a bracket member having a mounting portion and a body portion joining each other at an angle less than 90°, said body portion extending longitudinally of the motor and having projections thereon engaging the motor, said mounting portion being generally arcuate and extending circumferentially of the motor, the mounting portion having holes therein for mounting the bracket on said bolts and having radial arms engaging an end surface of the motor, and a capacitor mounted on the body portion of the bracket.

2. In combination, an electric motor, said motor having bolts extending longitudinally therethrough adjacent its periphery, a bracket member having a mounting portion and a body portion joining each other at an angle less than 90°, said body portion extending longitudinally of the motor and having projections thereon engaging the motor, said mounting portion being generally arcuate and extending circumferentially of the motor, the mounting portion having holes adjacent its ends for mounting the bracket on said bolts and having an opening adjacent its center for receiving one of said bolts, whereby the bracket can be positioned in any of a plurality of angular positions on the motor, the mounting portion having radial arms adjacent its ends engaging an end surface of the motor, and a capacitor mounted on the body portion of the bracket.

3. A mounting bracket for mounting a capacitor on an electric motor, said bracket having a mounting portion adapted to be mounted on one end of a motor and a body portion extending longitudinally from the mounting portion, said mounting portion and body portion joining each other at an angle less than 90°, said body portion having projections thereon adapted to engage the motor, and said mounting portion being generally arcuate and having radial arms extending therefrom.

4. A mounting bracket for mounting a capacitor on an electric motor, said bracket having a mounting portion adapted to be mounted on one end of a motor and a body portion extending longitudinally from the mounting portion, said mounting portion and body portion joining each other at an angle less than 90°, said body portion having projections thereon adapted to engage the motor, and said mounting portion being generally arcuate and having radial arms extending therefrom, the mounting portion having mounting holes adjacent its ends and having an opening at the center, whereby the bracket can be positioned on a motor in any of a plurality of angular positions.

5. In combination, an electric motor, said motor being generally cylindrical and having end surfaces substantially normal to the axis of the motor, a bracket member having a mounting portion secured on one of the end surfaces of the motor and having an elongated body portion extending longitudinally of the motor, said mounting portion and body portion joining each other at an angle less than 90°, said body portion having projections thereon engaging the motor, and a capacitor mounted on the body portion of the bracket.

6. In combination, an electric motor, said motor being generally cylindrical and having end surfaces substantially normal to the axis of the motor, a bracket member having a mounting portion secured on one of the end surfaces of the motor and having an elongated body portion extending longitudinally of the motor, said mounting portion and body portion joining each other at an angle less than 90°, said body portion having projections thereon engaging the motor, and said mounting portion having arms extending radially of the motor and engaging said end surface, and a capacitor mounted on the body portion of the bracket.

7. In combination, an electric motor, said motor being generally cylindrical and having end surfaces substantially normal to the axis of the motor, a bracket member having a mounting portion secured on one of the end surfaces of the motor and having an elongated body portion extending longitudinally of the motor, said mounting portion and body portion joining each other at an angle less than 90°, said body portion having projections thereon engaging the motor, and said mounting portion being generally arcuate and extending circumferentially of the motor and having radial arms engaging said end surface and extending inwardly from the mounting portion, and a capacitor mounted on the body portion of the bracket.

References Cited in the file of this patent

UNITED STATES PATENTS

| Number | Name | Date |
| --- | --- | --- |
| 1,312,295 | Apple | Aug. 5, 1919 |
| 1,322,831 | Seiss | Nov. 25, 1919 |
| 1,391,688 | Marsico | Sept. 27, 1921 |
| 2,003,031 | Baker | May 28, 1935 |
| 2,149,452 | Lewis et al. | Mar. 7, 1939 |
| 2,219,495 | Sleeter et al. | Oct. 29, 1940 |
| 2,253,405 | Veinott | Aug. 19, 1941 |